(12) United States Patent
Ippolito

(10) Patent No.: US 11,490,768 B1
(45) Date of Patent: Nov. 8, 2022

(54) TENSION SYSTEM TO RESTRAIN FOOD AND BEVERAGES DURING DELIVERY

(71) Applicant: Michael Ippolito, Suffern, NY (US)

(72) Inventor: Michael Ippolito, Suffern, NY (US)

(*) Notice: Subject to any disclaimer, the term of this patent is extended or adjusted under 35 U.S.C. 154(b) by 0 days.

(21) Appl. No.: 17/688,967

(22) Filed: Mar. 8, 2022

(51) Int. Cl.
| | |
|---|---|
| *B65D 81/38* | (2006.01) |
| *B65D 25/04* | (2006.01) |
| *A47J 47/14* | (2006.01) |
| *B60N 3/10* | (2006.01) |
| *B60R 11/00* | (2006.01) |

(52) U.S. Cl.
CPC .............. *A47J 47/14* (2013.01); *B60N 3/103* (2013.01); *B65D 25/04* (2013.01); *B65D 81/38* (2013.01); *A47J 47/145* (2013.01); *B60R 11/00* (2013.01); *B65D 2585/366* (2013.01)

(58) Field of Classification Search
CPC ......... A47F 1/126; A47J 47/14; A47J 47/145; B60N 3/103; B60N 3/105; B60N 3/106; B60N 3/107; B60N 3/108; B65D 25/04; B65D 2585/366; B65D 81/3897; B65D 5/721; B65D 83/0005; B65D 81/38; B65D 81/18; B60R 7/08; B60R 11/00; B60R 2011/0075; A45C 11/20; A45C 11/24; A45C 13/02; A45C 2013/026; A47G 23/0208; F25D 2331/801; F25D 3/08; Y10S 229/904; Y10S 229/925; Y10S 229/926; Y10S 229/805817
USPC .............. 206/545, 591, 563, 541, 817, 565; 211/51, 10; 220/536, 537, 561, 9.1–9.4, 220/918, 920, 915.2; 224/275, 925, 926, 224/539, 572; 229/904
See application file for complete search history.

(56) References Cited

U.S. PATENT DOCUMENTS

| | | | | |
|---|---|---|---|---|
| 551,692 | A * | 12/1895 | Schmidt ............ | B65D 83/0005 312/319.2 |
| 2,123,031 | A * | 7/1938 | Weiner .................... | A47J 41/00 312/351 |
| 2,584,435 | A * | 2/1952 | Doerr ........................ | F25D 3/14 220/523 |
| 3,145,848 | A * | 8/1964 | Wood ..................... | B60N 3/103 224/571 |
| 3,326,445 | A * | 6/1967 | Goings .................. | A47B 31/06 211/74 |
| 3,428,103 | A * | 2/1969 | Walsh ................... | A47J 47/145 383/110 |
| 3,893,585 | A * | 7/1975 | Morrison ............... | B60R 7/088 206/387.14 |
| 4,538,737 | A * | 9/1985 | Delaney .................... | B60R 7/02 211/184 |

(Continued)

OTHER PUBLICATIONS

"Nesthao Updated Professional Insulated Food Delivery Bag with Support Frame and Plastic Bottom Plate, Grocery Delivery Bag for Catering, Restaurants, Delivery Drivers, Uber Eats, Doordash and more," found: https://www.amazon.com/Nesthao-Professional-Insulated-Delivery-Rest . . . on Dec. 3, 2021.

*Primary Examiner* — Gideon R Weinerth
(74) *Attorney, Agent, or Firm* — Saile Ackerman LLC; Stephen B. Ackerman; Rosemary L. S. Pike

(57) ABSTRACT

A food and drink delivery bag is described, comprising a frame, a tension bar attached to the frame and configured to slide across a width of the frame and to remain under tension against food products along the width of the frame, and an insulated bag covering the frame.

23 Claims, 11 Drawing Sheets

(56) References Cited

U.S. PATENT DOCUMENTS

| | | | | |
|---|---|---|---|---|
| 4,595,101 A * | 6/1986 | Rivera | B65D 81/3897 | 383/110 |
| 4,684,087 A * | 8/1987 | Spickard | B65B 67/12 | 224/539 |
| 4,802,233 A * | 1/1989 | Skamser | B65D 81/3897 | 383/110 |
| 4,916,923 A * | 4/1990 | Adams | A45C 11/20 | 62/530 |
| 4,964,528 A | 10/1990 | Wagoner | | |
| 5,253,791 A | 10/1993 | Chiodo | | |
| 5,268,149 A * | 12/1993 | Arafat | B01L 9/00 | 422/551 |
| 5,501,338 A * | 3/1996 | Preston | B65D 21/0213 | 294/149 |
| 5,547,086 A * | 8/1996 | Chen | G11B 33/0461 | 211/40 |
| 5,687,893 A * | 11/1997 | Jacobsmeyer, Jr. | B60R 7/043 | 211/195 |
| 5,713,502 A * | 2/1998 | Dixon | B60R 7/02 | 211/12 |
| 6,193,067 B1 * | 2/2001 | McMahan | B65D 5/721 | 206/805 |
| 6,296,165 B1 * | 10/2001 | Mears | A45C 15/00 | 150/108 |
| 6,305,532 B1 * | 10/2001 | Overkamp | B60N 3/103 | 206/217 |
| 6,439,388 B1 * | 8/2002 | Lerner | A47G 19/065 | 206/562 |
| 6,536,640 B1 * | 3/2003 | Gent | B60R 9/00 | 224/403 |
| 6,936,791 B1 * | 8/2005 | Baldwin | H05B 3/00 | 219/521 |
| 7,415,932 B1 * | 8/2008 | Ngo | B60N 3/103 | 108/4 |
| 7,429,078 B1 * | 9/2008 | Tarlow | B60R 7/043 | 297/188.2 |
| 7,481,313 B1 * | 1/2009 | Kramedjian | B65D 5/4225 | 206/427 |
| 7,797,774 B1 * | 9/2010 | Beyert | A47D 5/006 | 5/655 |
| 7,931,188 B2 * | 4/2011 | Marinelli | B65D 5/52 | 248/152 |
| 9,381,871 B2 * | 7/2016 | Murray | B60R 11/00 | |
| 9,610,900 B1 * | 4/2017 | Bello | B60N 3/103 | |
| 9,878,673 B2 * | 1/2018 | Harris | B60R 7/043 | |
| 10,092,137 B1 | 10/2018 | Nelson et al. | | |
| 10,202,060 B2 * | 2/2019 | Huebner | B60N 2/90 | |
| 10,214,130 B2 * | 2/2019 | DeLeon | B65D 11/1833 | |
| 10,443,918 B2 | 10/2019 | Li et al. | | |
| 2006/0011686 A1 * | 1/2006 | Latham | B60R 7/04 | 190/102 |
| 2007/0207000 A1 * | 9/2007 | Bohlke | B60R 5/04 | 410/94 |
| 2008/0006639 A1 * | 1/2008 | Davis | B65D 83/0038 | 220/507 |
| 2008/0142558 A1 * | 6/2008 | Dexter | B60R 7/02 | 190/110 |
| 2012/0125966 A1 * | 5/2012 | Greenspon | B60R 7/00 | 190/115 |
| 2012/0321226 A1 * | 12/2012 | Hansen | B65D 77/04 | 383/104 |
| 2013/0264363 A1 * | 10/2013 | Ballou | B65D 25/04 | 224/42.32 |
| 2014/0346084 A1 * | 11/2014 | Finell | A47G 23/06 | 206/565 |
| 2016/0150917 A1 * | 6/2016 | Volke | A47J 47/145 | 206/541 |
| 2017/0008439 A1 * | 1/2017 | DiFiore | A47J 47/145 | |
| 2017/0081082 A1 | 3/2017 | Murphy | | |
| 2017/0129409 A1 | 5/2017 | Arellanes et al. | | |
| 2019/0059536 A1 * | 2/2019 | Farro | A45F 3/04 | |
| 2020/0109889 A1 * | 4/2020 | Kieling | B65D 81/38 | |
| 2021/0402907 A1 * | 12/2021 | Adams | B60N 3/103 | |

\* cited by examiner

TENSION SYSTEM TO RESTRAIN FOOD AND BEVERAGES DURING DELIVERY

TECHNICAL FIELD

This disclosure relates to a system to restrain food and beverages during delivery, and more particularly, to a tension system to restrain food and beverages during delivery.

BACKGROUND

Food delivery drivers usually place food products directly on the passenger front seat of a car or truck or on the floor of the vehicle. Sometimes the food is placed in a delivery bag as well. In either case, the goods being delivered are not secured to the seat or within the delivery bag. This can lead to spilled food products, damage to the car, and diminished efficiency.

SUMMARY

A principal objective of the present disclosure is to restrain food and beverages during delivery.

Another objective of the present disclosure is to restrain food and beverages in a delivery container during delivery wherein adjustments can be made easily to secure various sizes and types of food and drink products.

Still another objective is to restrain food and beverages during delivery in a delivery container that is insulated to keep food at temperature and wherein adjustment can be made easily to secure various sizes and types of food and drink containers.

Yet another objective is to restrain food and beverages during delivery in a delivery container that can be secured to the seat of a vehicle.

In accordance with the objectives of the disclosure, a food and drink delivery bag is achieved comprising a frame, a tension bar attached to the frame and configured to tensionably slide across a width of the frame and to remain under tension against food products along the width of the frame, and an insulated bag covering the frame. Optionally, the delivery bag may be secured to the seat of a vehicle.

BRIEF DESCRIPTION OF THE DRAWINGS

In the accompanying drawings forming a material part of this description, there is shown.

DETAILED DESCRIPTION

The food and beverage tension restraining system of the present disclosure restrains food and drink products under constant tension within an insulated container that securely attaches to a car seat. The tension bar that secures food within the insulated container can be effortlessly adjusted to accommodate various food and drink products.

The system of the present disclosure secures food and drinks for delivery. It can be easily adjusted to secure various sizes and types of food and drink products. The delivery bag is insulated to keep food at its current temperature, either hot or cold. Putting food and beverages into the delivery bag and adjusting the tension restraining system is quick and efficient. The delivery bag system of the present disclosure prevents damage to the delivery car and is hygienic.

Food delivery can be precarious, especially with foods that can topple or leak during transport. The system of the present disclosure solves the problems that plague food delivery drivers as they deliver food and drinks from pick up locations to customers. Delivery drivers need to keep food products secure and manage their temperature, all while maintaining speed and efficiency.

A tension bar maintains constant horizontal tension to food and drinks within an insulated container. The tension bar can be easily manipulated with one hand and adjusted to accommodate different sized food and drink items. Once placed in the container, the tension bar keeps items from moving during transport.

Figure 1:
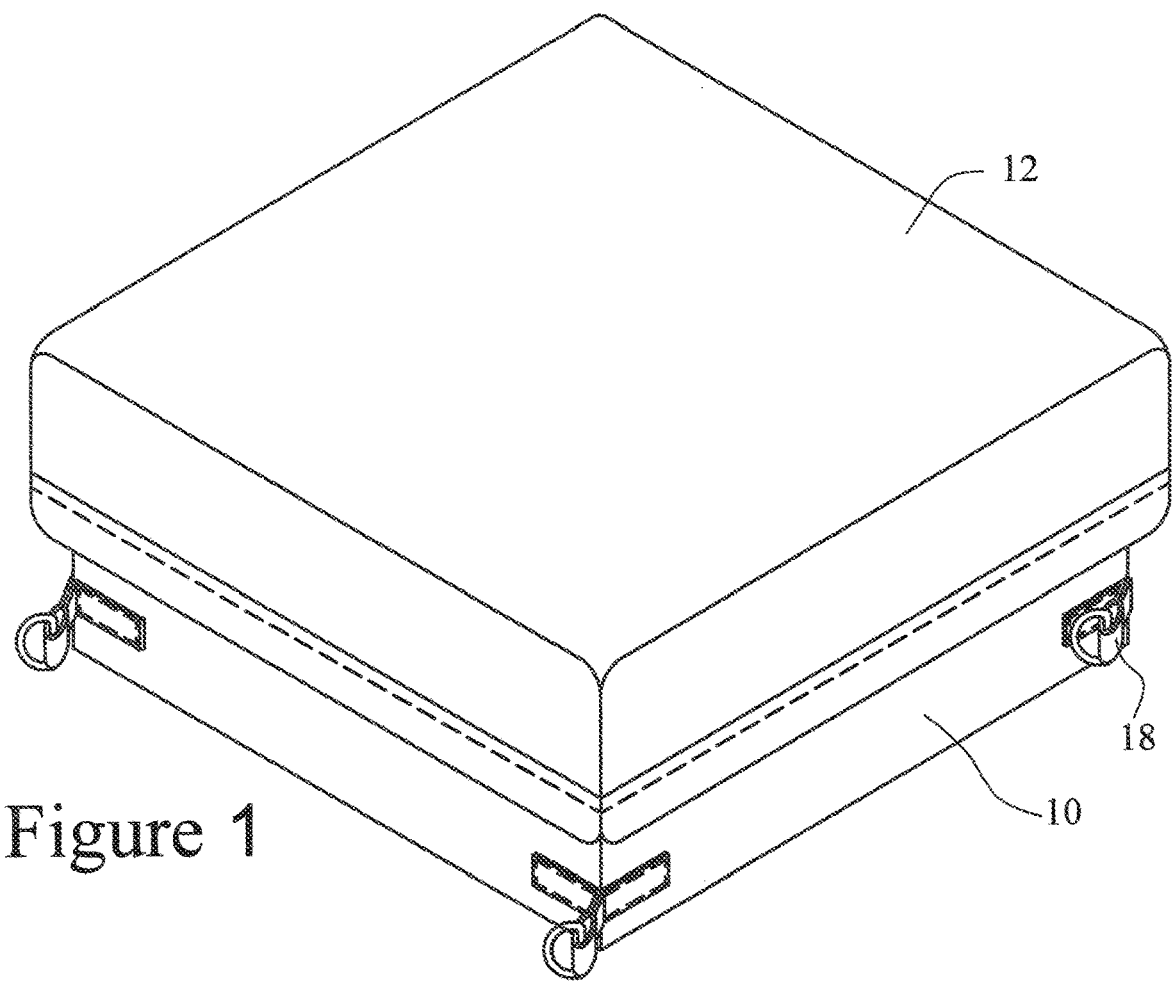
FIG. 1 is an orthogonal view of a food and drink delivery bag in a preferred embodiment of the present disclosure.
Figure 2:
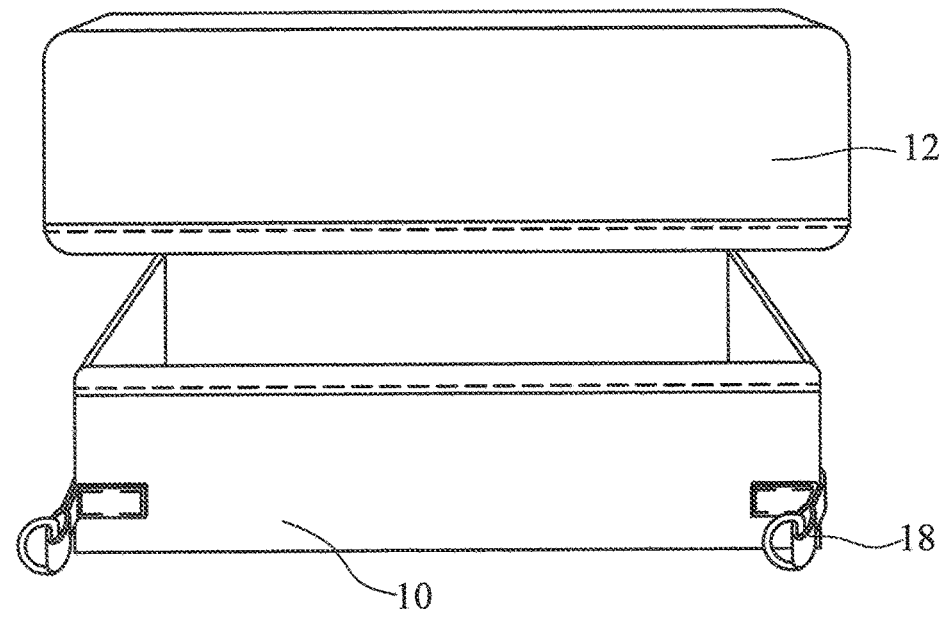
FIG. 2 is a side view of the food and drink delivery bag of the preferred embodiment of the present disclosure.

Referring now more particularly to the drawing figures, the delivery bag of the present disclosure will be described in detail. FIG. 1 illustrates the top, front, and one side of an exemplary delivery bag 10 of the present disclosure. FIG. 2 illustrates the bag 10 of FIG. 1 with the cover 12 partly open. The cover is oversized so that it will fit over the bag even if items inside are taller than the sides of the bag. Bag 10 is made of an insulating material. Preferably, the insulating material comprises insulating fabric, bubble or foam insulation, and so on, preferably having several layers for insulation, and with an inner layer being moisture resistant. Preferably the inner layer of the bag is a moisture-resistant material for easy cleanup and to prevent any spills or condensation from leaving the inner layer. Preferably the material of the bag will allow the bag to stand up without support. The cover 12 will overlap the top edges of the bag 10 to provide insulation and temperature control to the items inside the bag.

Figure 3:
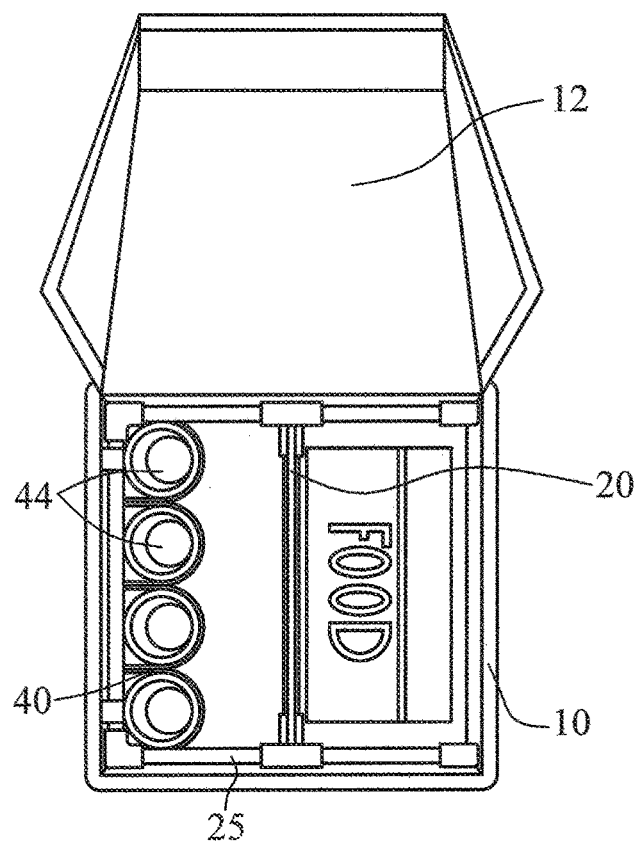
FIG. 3 is a top view of the inside of the food and drink delivery bag in a first preferred embodiment of the present disclosure.
Figure 4:
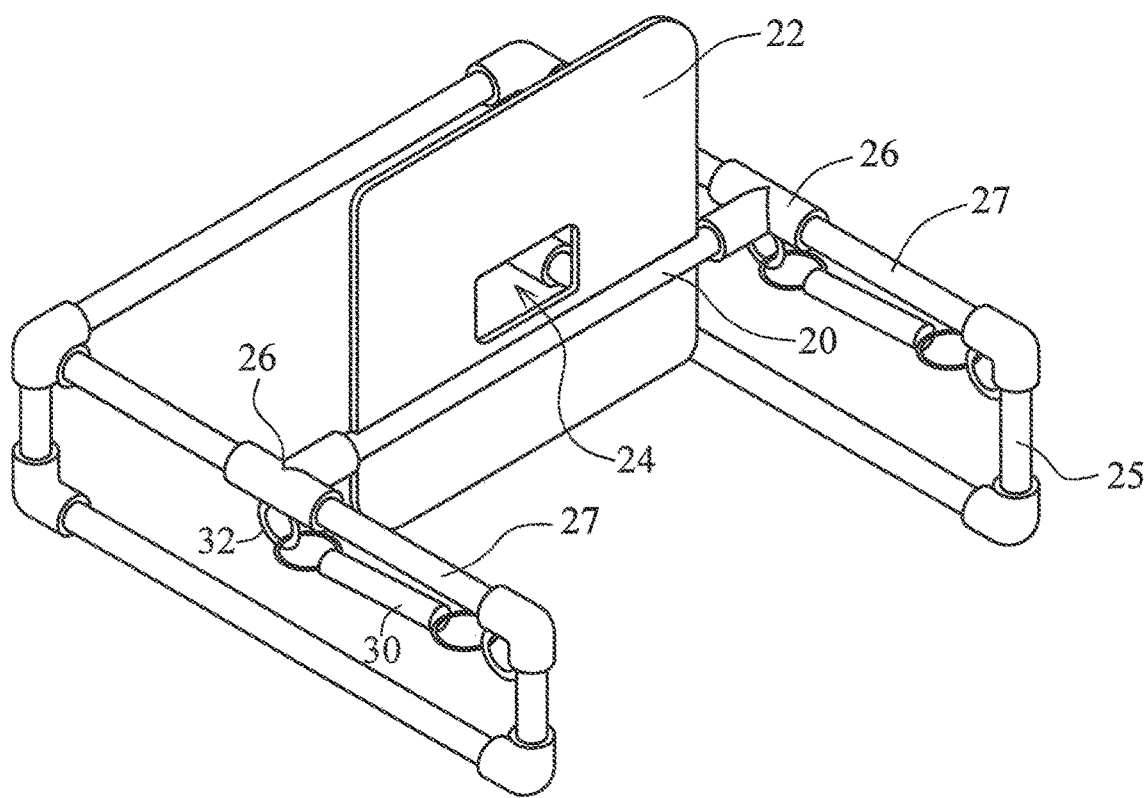
FIG. 4 is an orthogonal view of a frame that fits inside of the food and drink delivery bag in the first preferred embodiment of the present disclosure.

Referring now to FIGS. 3-7, a first preferred embodiment of the tension system of the present disclosure will be described. FIG. 3 shows the interior of the bag 10, tension bar 20, and drinks 44 held in a drink holder 40. Placed inside the bag 10 is a frame 25. Preferably the frame 25 is made of plastic. The frame 25 could alternately be constructed of metal, wood, or combinations thereof. Preferably a tension bar 20, shown in FIG. 4, is located between two opposite sides of the rectangular frame 25. The height of the topmost bars 27 of the frame 25 is preferably about at the midpoint of the height of the bag 10. Each end of tension bar 20 is slidably attached to one of the two opposing bars 27, preferably by tee fittings 26. A fixed panel 22 is attached to the tension bar 20. The fixed panel 22 provides vertical stability to tall or stacked items and includes a cutout 24 so that a user can grasp the bar 20. Panel 22 could attach to the tension bar 20, for example, by being injection molded as one piece with the tension bar, by being clipped onto the tension bar, or by being inserted into a slot in the tension bar 20.

Figure 5:
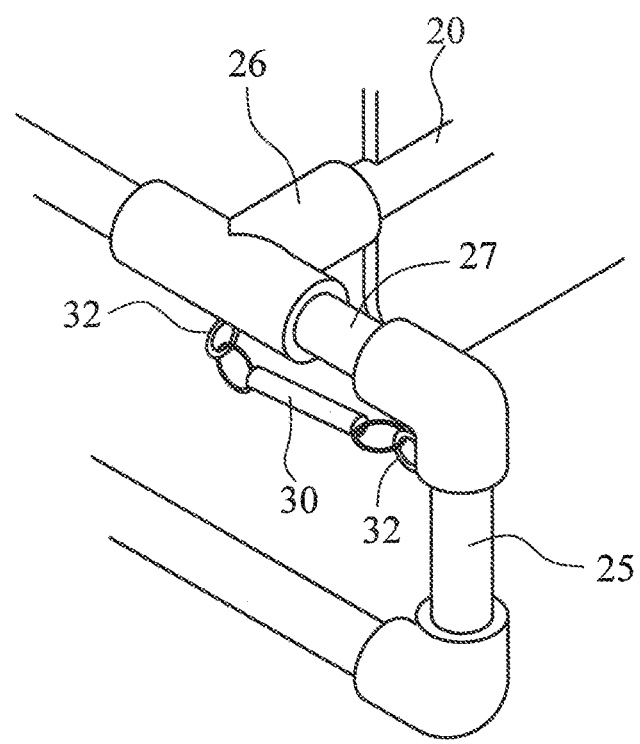
FIG. 5 is a close-up view of a tension mechanism on the frame that fits inside of the food and drink delivery bag in the first preferred embodiment of the present disclosure.

FIG. 5 is a close-up view of the frame 25 showing a spring 30 attached to the frame 25 and to the tee fitting 26 at one end of the tension bar 20. Preferably the spring 30 is attached to the frame and the tee fitting by eye hooks 32. Other methods of attaching the spring could be used, such as clips, custom injection molding fittings at each point of attachment, and so on. A spring 30 is attached to each end of the tension bar 20.

Figure 6A:
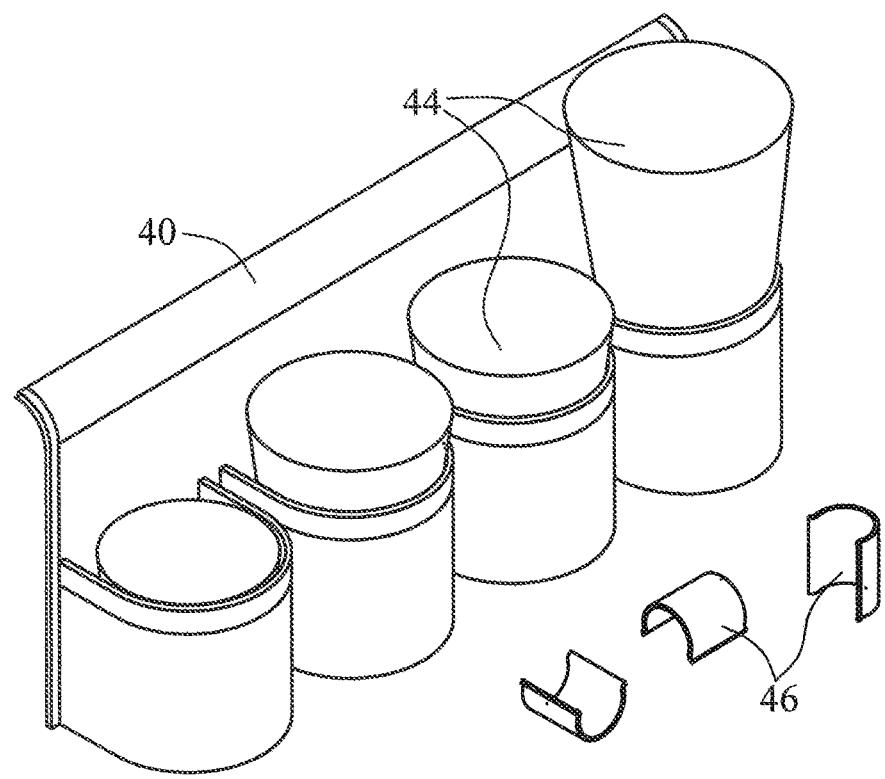
FIG. 6A is an orthogonal view of a front side of a drink holder that clips onto the frame of the food and drink delivery bag in the first preferred embodiment of the present disclosure.
Figure 6B:
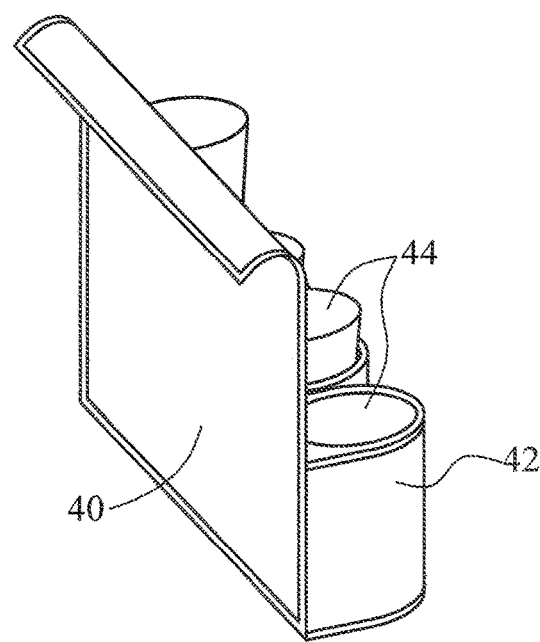
FIG. 6B is an orthogonal view of a back side of the drink holder that clips onto the frame of the food and drink delivery bag in the first preferred embodiment of the present disclosure.
Figure 7A:
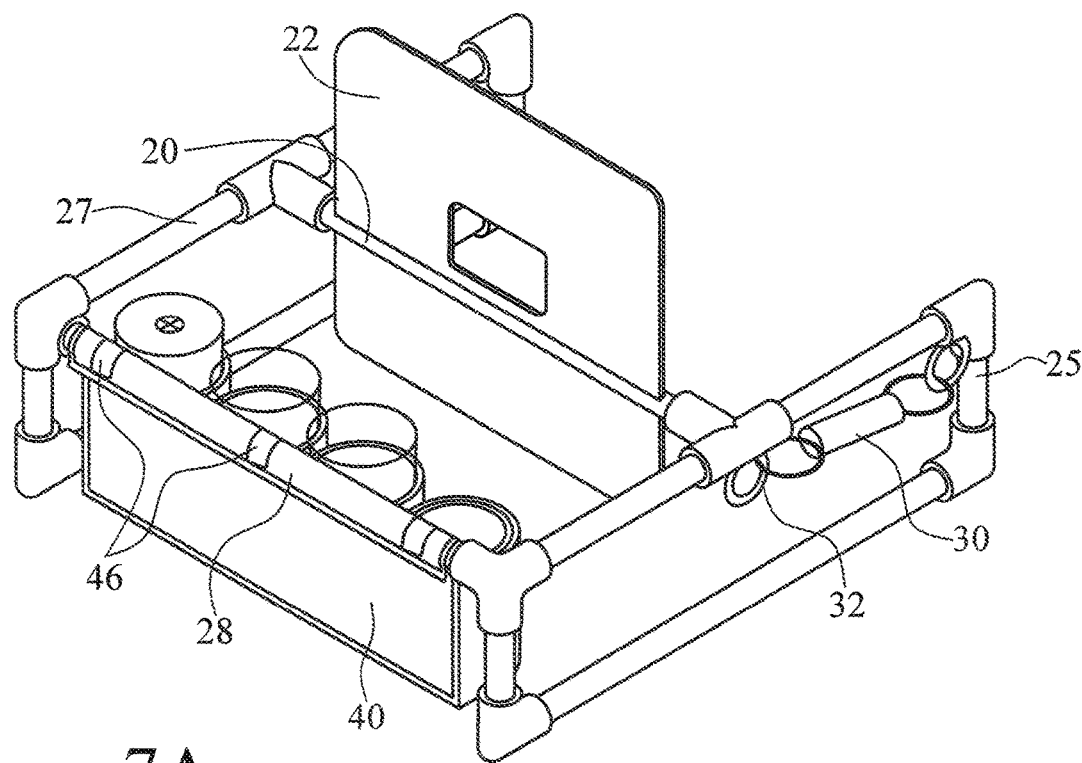
FIG. 7A is an orthogonal view of the drink holder clipped on the frame in the first preferred embodiment of the present disclosure.
Figure 7B:
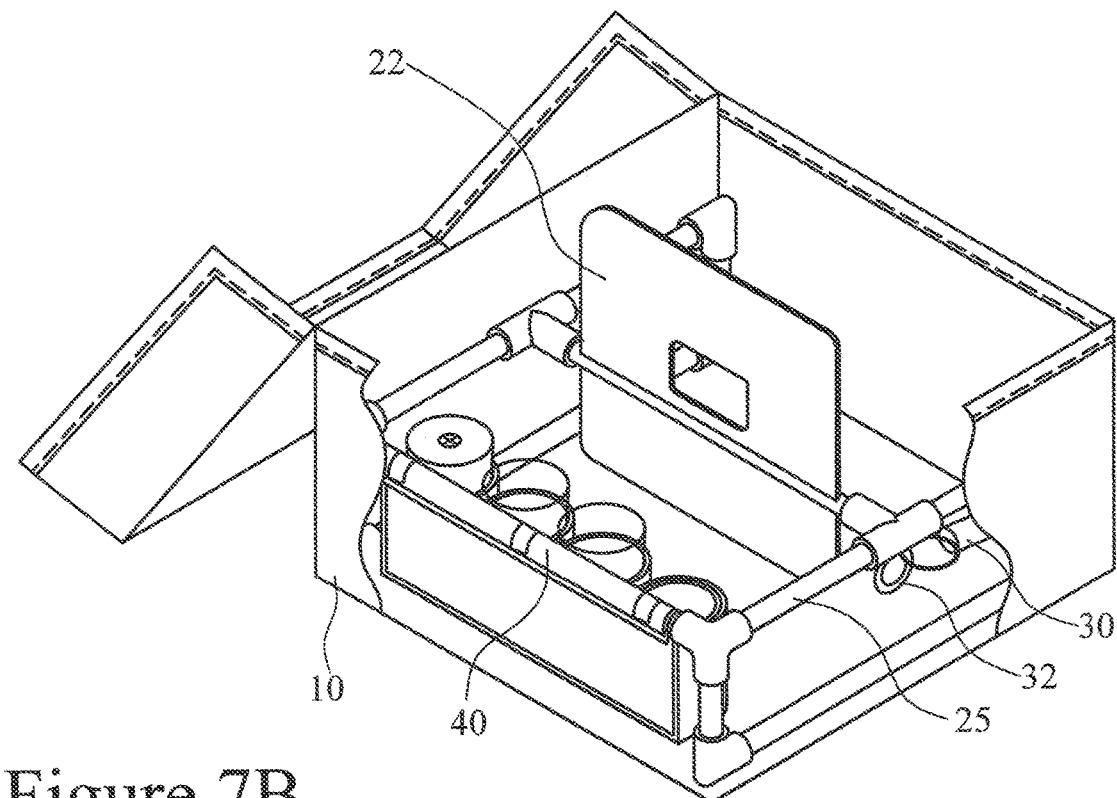
FIG. 7B is an orthogonal view of the drink holder clipped on the frame inside the food and drink delivery bag in the first preferred embodiment of the present disclosure.

FIGS. 6A and 6B illustrate a drink holder 40 having drink containers 44 held therein. Insulated receptacles 42 hold drinks of assorted sizes. Clips 46 attach the drink holder to the end bar of the frame. FIGS. 7A and 7B show the drink holder 40 attached to the end bar 28 of the frame 25. The end bar 28 is perpendicular to the side bars 27. Clips 46 hold the flap of the drink holder 40 onto the bar 28. FIG. 7B shows the frame 25 with the fixed panel 22 and the drink holder 40 placed within the bag 10.

A user can slide the tension bar 20 horizontally along the frame side bars 27 so that food items placed within the bag are held securely. The tension bar can be easily manipulated with one hand and adjusted to accommodate different sized food and drink items. Tension is achieved by a pulling force exerted by tension springs. Once the tension bar is pulled from its initial position, the bar remains under tension against the food product behind it within the bag. The tension bar keeps items from moving during transport. When the food product is removed, the tension bar returns to its initial position.

Figure 8:
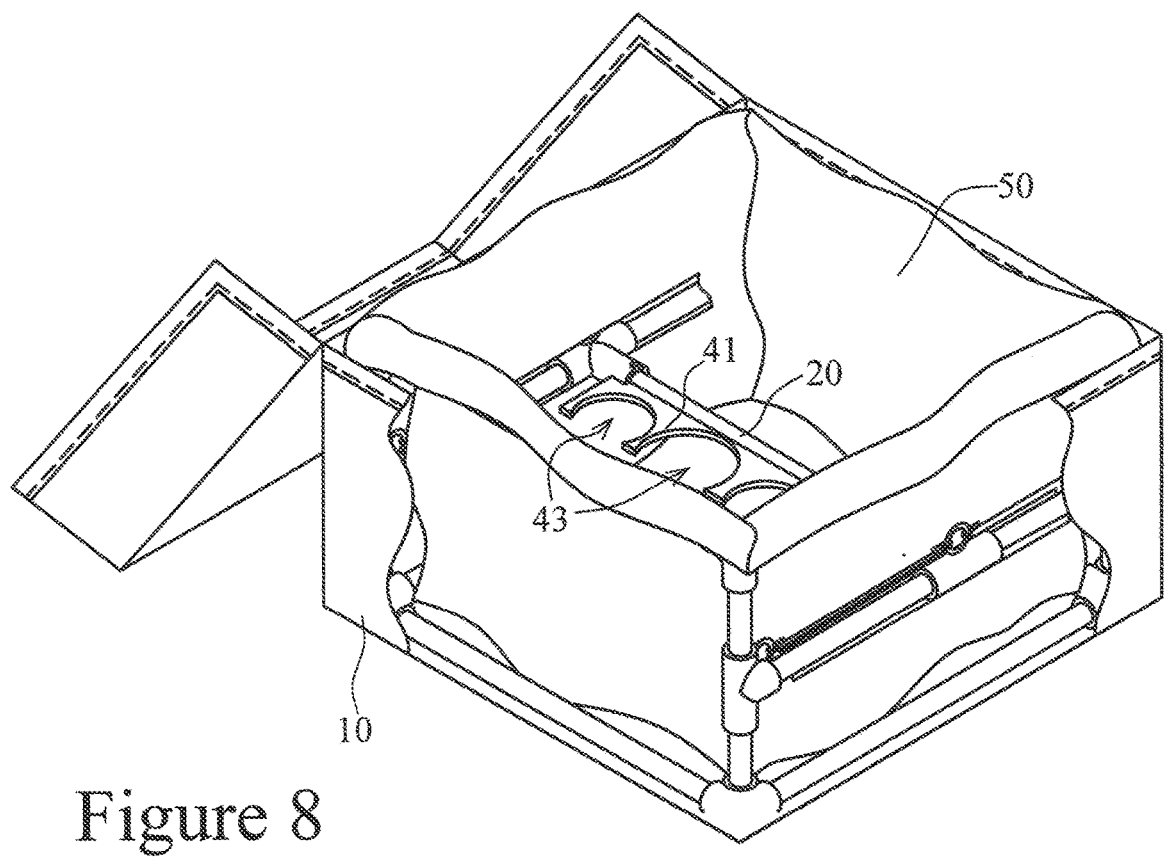
FIG. 8 is an orthogonal view of a frame inside of the food and drink delivery bag showing the tension restraining system in a second preferred embodiment of the present disclosure.
Figure 9:
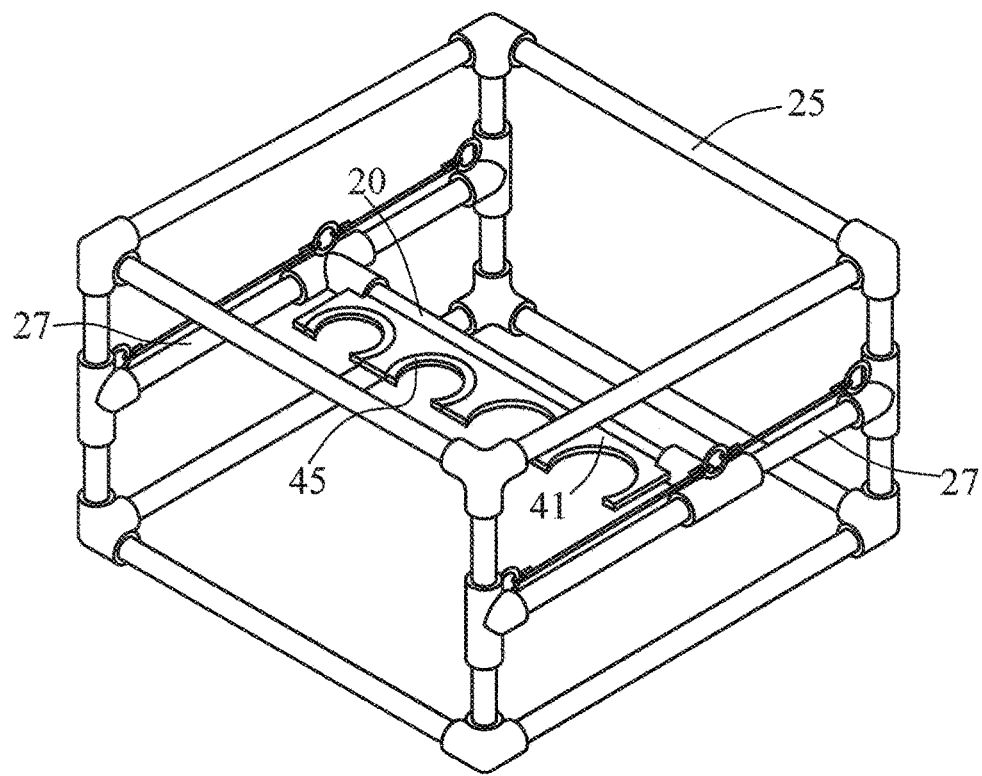
FIG. 9 is an orthogonal view of a frame that fits inside of the food and drink delivery bag in the second preferred embodiment of the present disclosure.

Referring now to FIGS. 8-15, a second preferred embodiment of the tension system of the present disclosure will be described. FIG. 8 shows a moisture-resistant inner liner 50 within the interior of the bag 10, tension bar 20, and a drink holder 41 having slots 43 to hold drinks of various sizes. The drink holder slots 43 may be of differing sizes, as shown in FIG. 8, or the drink holder slots may be modified to accept any size drink container by adding flexible inserts. Foam, rubber, or other flexible material inserts 45 can be added to the inside perimeter of the slots to flex and adapt to different sized drink containers placed within the slots, as shown in FIG. 9.

FIG. 9 illustrates the frame 25 outside of the bag 10. Preferably the frame 25 is made of plastic. The frame 25 could alternately be constructed of metal, wood, or a combination thereof. Preferably a tension bar 20 is located between two opposite sides of the rectangular frame 25. The height of the middle bars 27 of the frame 25 is preferably about five inches, dependent upon the expected height of drink containers to be placed in the drink holder.

Each end of tension bar 20 is slidably attached to one of the two bars 27, preferably by tee fittings 26. Tension is achieved using opposing elastic cords that keep the bar stable at any position. The tension bar is mounted to a frame that is nestled between a moisture resistant inner liner 50 and insulated outer bag 10. Horizontal slits in the inner liner 50 allow the bar to move back and forth within the interior of the container. The tension bar can be easily manipulated with one hand and adjusted to accommodate different sized food and drink items. Once placed in the container, the tension bar keeps items from moving during transport.

Figure 10:
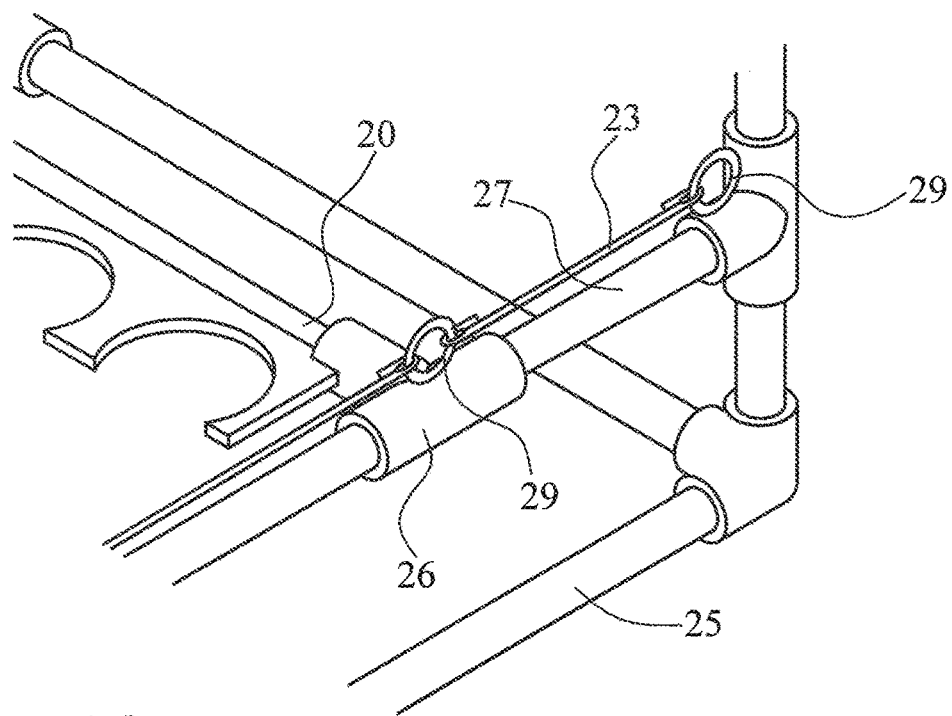
FIG. 10 is a close-up view of the tension restraining system in the second preferred embodiment of the present disclosure.

Now, details of the tension bar system of the second preferred embodiment will be described. FIG. 10 illustrates a close-up view of one end of the tension bar 20. A tee fitting 26 is slidably mounted on each bar 27. Elastic cords 23 are preferably fastened to eye hooks 29, for example, mounted on each side where the bar 27 attaches to the corner of the frame 25 and mounted on the tee fitting 26 into which the tension bar 20 fits. Other methods of attaching to elastic cords 23 could be used, such as clips, custom injection molding fittings at each point of attachment, and so on.

Figure 11:
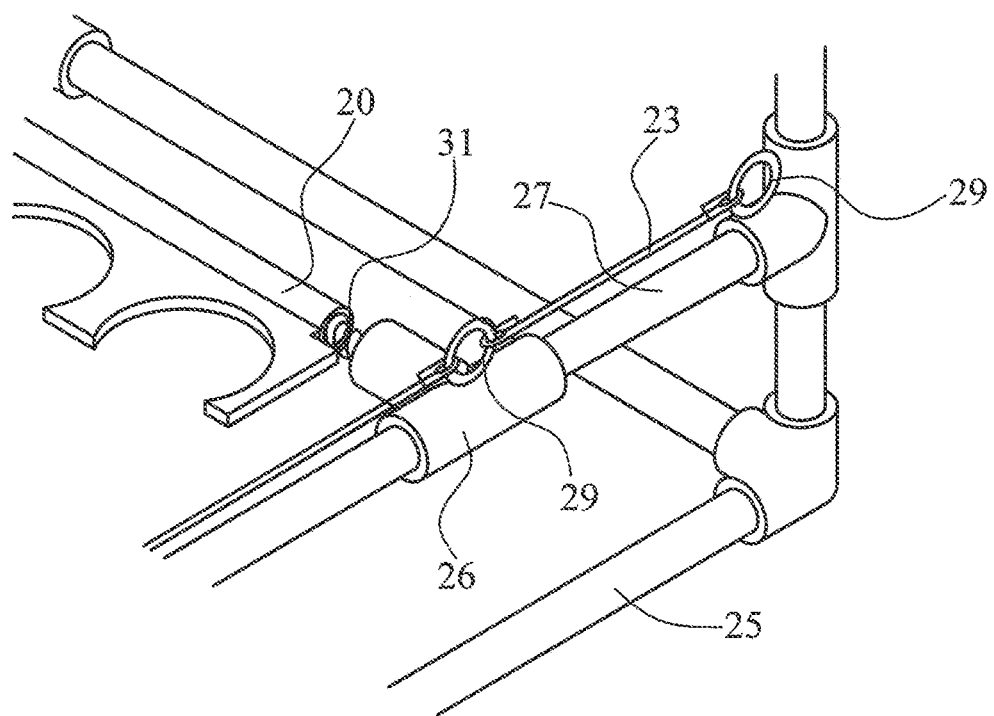
FIG. 11 is a close-up view of a spring end of the tension restraining system in the second preferred embodiment of the present disclosure.
Figure 12:
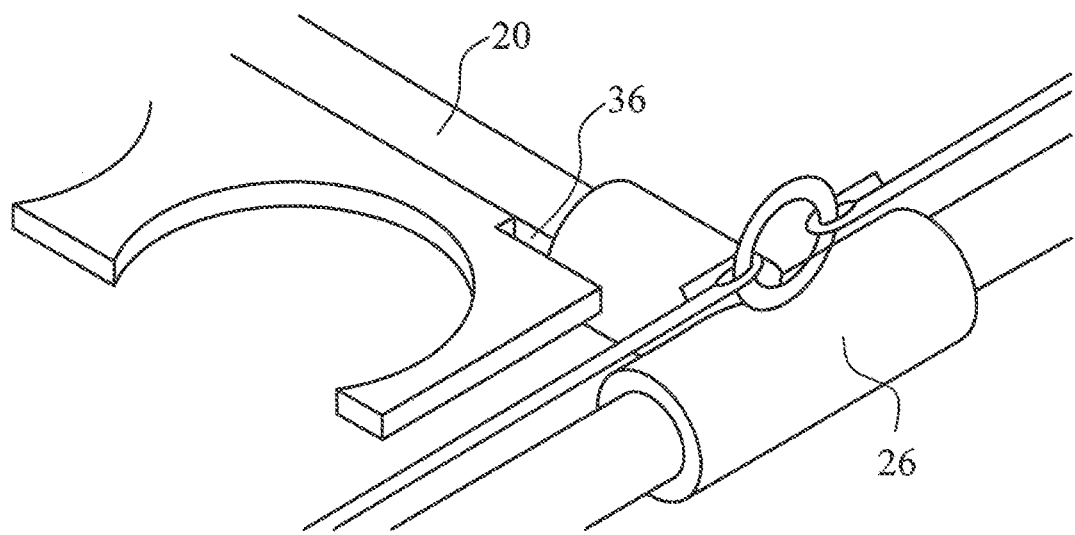
FIG. 12 is another close-up view of the spring end of the tension restraining system in the second preferred embodiment of the present disclosure.
Figure 13:
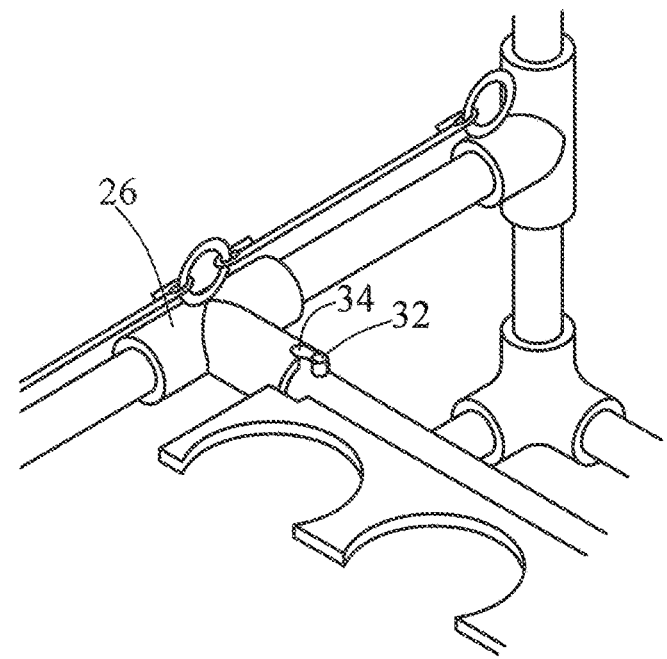
FIG. 13 is a close-up view of a pin end of the tension restraining system in the second preferred embodiment of the present disclosure.

The tension bar 20 can be rotated and locked into one of four positions, with the drink holder 41 horizontal or vertical with respect to the frame 25. This allows the drink holder to be locked in an up or down position when not in use which increases space inside of the carrier unit. Refer now to FIGS. 11-13. A spring 31 on one end of the tension bar 20 provides the force to set a pin 32 on the other end of the tension bar into any one of four notches 34 in the tee fitting 26 that locks the bar in place. The user pulls the tension bar 20 toward the spring 31 end to disengage the pin 32, rotates the bar 20 to the next position, and then releases the bar which locks the pin 32 in place. FIG. 11 shows the spring 31 in tee fitting 26. FIG. 12 shows the tension bar 20 inserted into the tee fitting 26 against the spring 31. Area 36 of the tension bar 20 can be pushed in against the spring to release the pin 32 from notch 34 in the tee fitting 26 on the opposite end of the tension bar 20, as shown in FIG. 13.

Figure 14A:
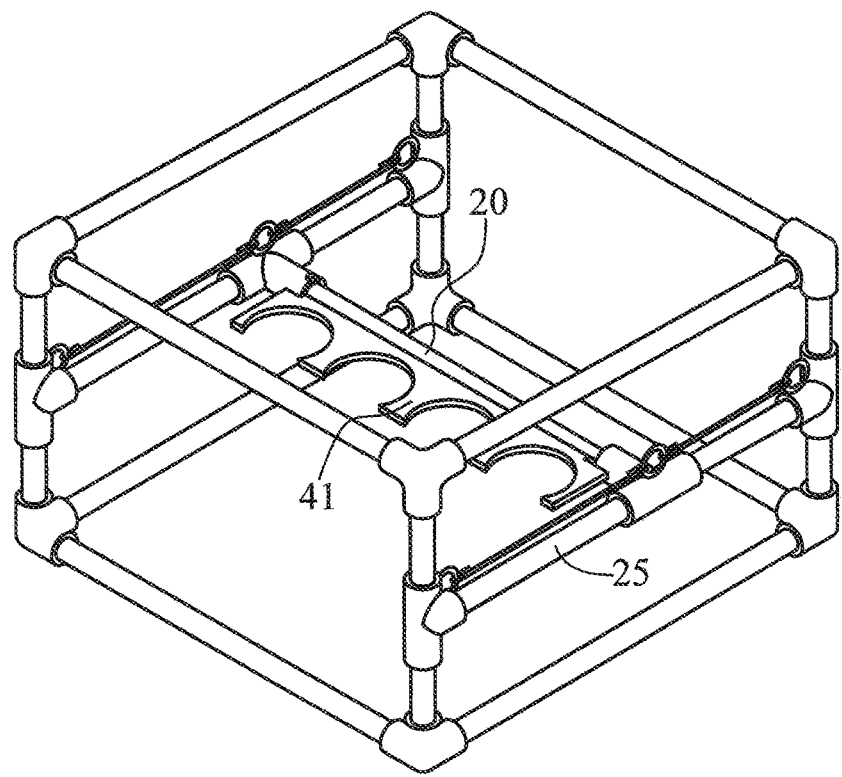
FIGS. 14A and 14B illustrate horizontal and vertical positions, respectively, of the drink holder in the second preferred embodiment of the present disclosure.
Figure 14B:
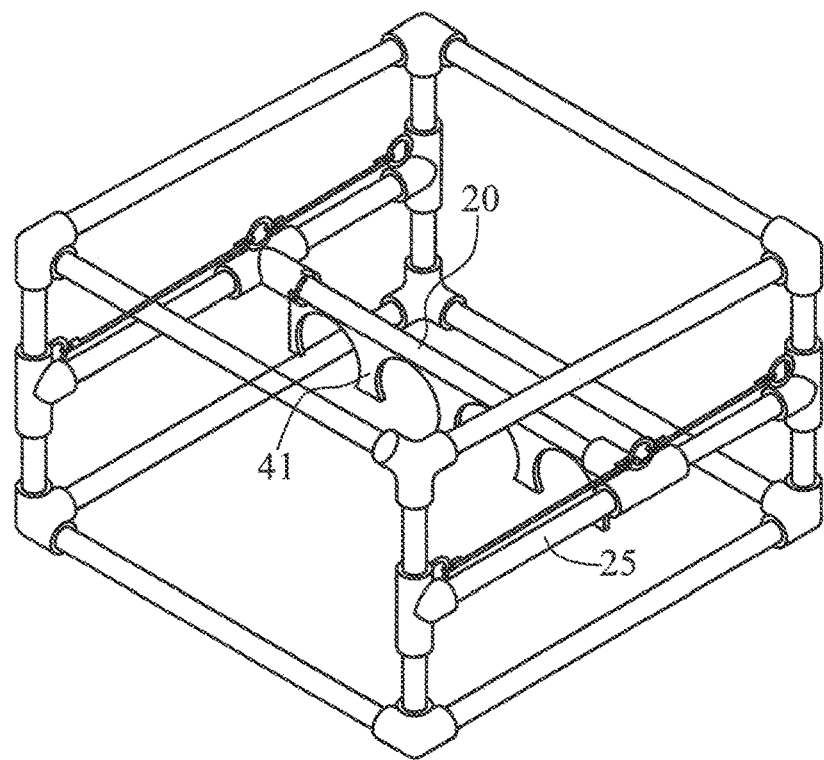

FIG. 14A shows the drink holder 41 held in a horizontal position for use and FIG. 14B shows the drink holder 41 held in a vertical position for storage. Notches provide 90° increments so that horizontal positions can face the front of the bag or the back of the bag and vertical positions point down as shown in FIG. 14B or point up.

Figure 15:
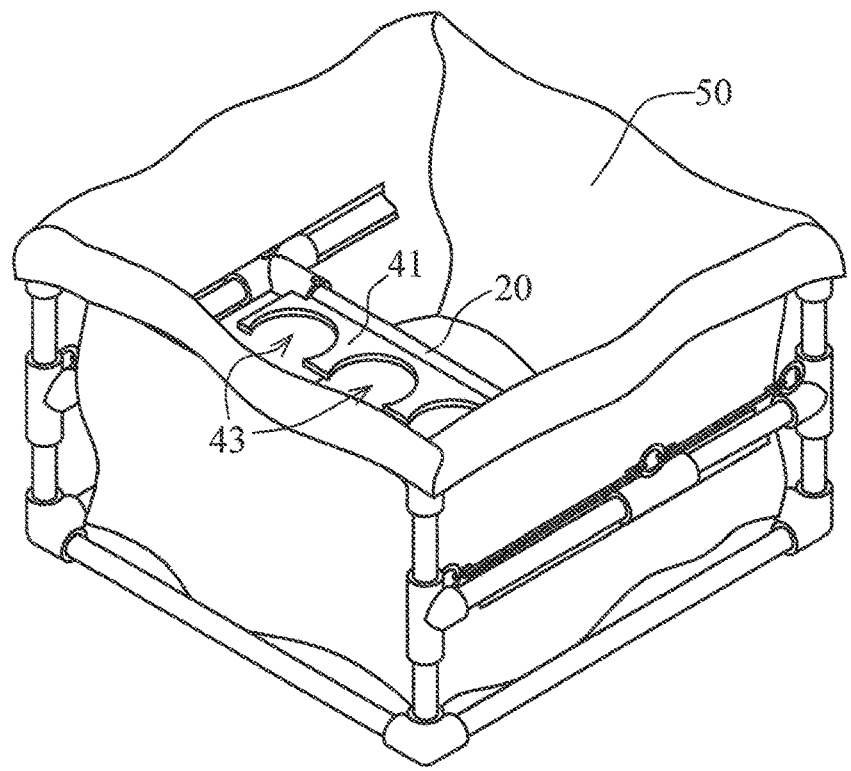
FIG. 15 is an orthogonal view of the frame showing the tension restraining system and a moisture resistant inner liner in the second preferred embodiment of the present disclosure.

FIG. 15 illustrates the inner liner 50 inside the frame 25. Preferably, inner liner 50 is made of a moisture-resistant material for easy cleanup and to prevent any spills or condensation from leaving the inner liner. The outer bag 10 is made of an insulated material, preferably having several layers for insulation and to allow the bag to stand up without support. Tube clips may be added to attach the inner liner to the frame, such as clips 46 shown in FIG. 6A.

To use the delivery bag, any drinks are inserted into the drink holder 40 or 41. If there are no drinks, the drink holder 40 may be removed from the delivery bag. The drink holder 41 may be locked into a vertical position, as shown in FIG. 14B, if desired. The tension bar 20 is pulled from its resting position, food items are placed into the bag, and then the tension bar is released against the items in the bag to keep them restrained and secure during travel. The tension bar 20 can be pulled with one hand. Once the tension bar is pulled from its initial position, the bar remains under tension against the food product behind it within the bag. When the food product is removed, the tension bar returns to its initial position.

Figure 16:
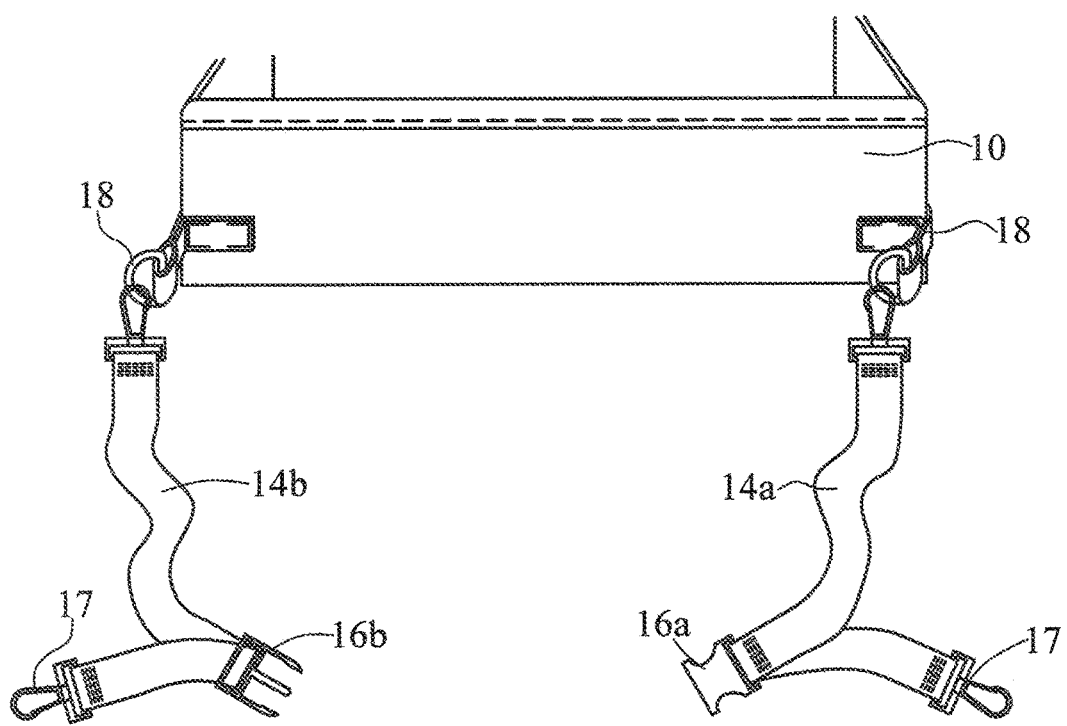
FIG. 16 is a back view of the food and drink delivery bag showing attachment mechanisms for attaching the bag to a front seat or to a rear seat in a preferred embodiment of the present disclosure.

Optionally, the delivery bag 10 may have an adjustable strap with buckles to attach the bag to the front seat of the vehicle. FIG. 16 illustrates straps 14a and 14b with mating buckles 16a and 16b. Furthermore, integrated latch clips 17 are standard child car seat clips that can clip to the child car seat anchor in the back seat to attach the delivery bag to the back seats of a vehicle. Strap connection points 18 can be provided on all four corners of the delivery bag so that the user can customize the direction in which the cover opens.

Figure 17:
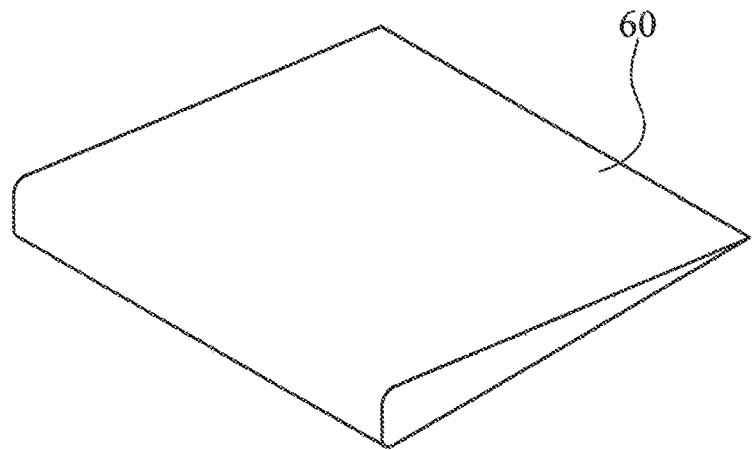
FIG. 17 is an orthogonal view of an inclined wedge of the present disclosure.
Figure 18:
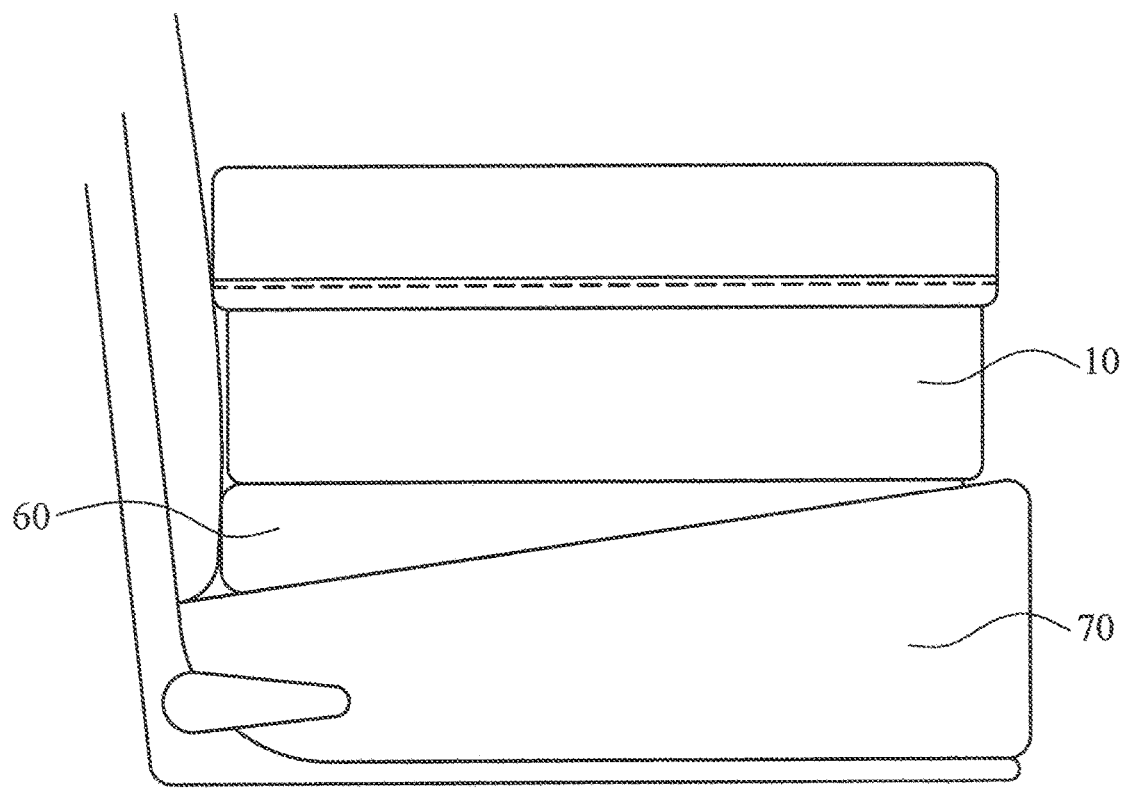
FIG. 18 is a side view of the inclined wedge attached to the bottom of the food and drink delivery bag of the present disclosure in use in a vehicle.

Optionally, the delivery bag of the present disclosure can have an inclined base to compensate for the slope of the car seat. A dense foam wedge 60, shown in FIG. 17, can be attached to the bottom of the entire unit to compensate for the incline of car seats. This keeps the unit level with the seat and provides more stability for food or drink items during transport. The wedge is attached using hook and loop fasteners (such as Velcro® Brand) and can be detached if incline compensation is not required. FIG. 18 illustrates the wedge 60 attached to the bottom of the delivery bag 10 on a car seat 70, for example.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter and the appended claims.

What is claimed is:

1. A food and drink delivery bag comprising:
   a frame;
   a tension bar attached to said frame configured to tensionably slide across a width of said frame and to provide constant horizontal tension against items placed in said delivery bag along said width of said frame; and
   an insulated bag covering said frame.

2. The delivery bag according to claim 1 further comprising a fixed panel affixed to said tension bar wherein said fixed panel divides an inside of said delivery bag into two compartments and wherein said fixed panel is configured to provide vertical stability to items within said delivery bag.

3. The delivery bag according to claim 2 further comprising a cut out in said fixed panel configured to allow grasping of said tension bar to change a position of said tension bar along said width of said frame.

4. The delivery bag according to claim 1 further comprising a drink holder affixed to said frame.

5. The delivery bag according to claim 4 wherein a flap of said drink holder is affixed to said frame by at least one clip.

6. The delivery bag according to claim 4 wherein said drink holder further comprises a plurality of insulated drink receptacles.

7. The delivery bag according to claim 1 further comprising a drink holder affixed to said tension bar.

8. The delivery bag according to claim 7 wherein said drink holder is rotatably affixed to said tension bar and wherein said drink holder is locked into a horizontal position with respect to said frame when in use and locked into a vertical position with respect to said frame when not in use.

9. The delivery bag according to claim 7 further comprising a plurality of drink holder slots in said drink holder.

10. The delivery bag according to claim 9 further comprising flexible inserts in one or more of said plurality of drink holder slots configured to hold a variety of drink sizes.

11. The delivery bag according to claim 1 wherein said insulated bag has a moisture resistant inner lining.

12. The delivery bag according to claim 1 further comprising a moisture resistant inner lining wherein said frame is positioned between said inner lining and said insulated bag.

13. The delivery bag according to claim 1 further comprising an oversized insulated cover configured to fit over items within said insulated bag and overlap top edges of said insulated bag.

14. The delivery bag according to claim 1 further comprising a latch system comprising:
   a connection point on each of four corners on an outside surface of said delivery bag;
   a pair of adjustable straps having mating buckles on one end of each strap and configured to attach to two of said connection points at an opposite end of each strap to secure said delivery bag by said adjustable straps and said buckles around a front seat of a vehicle; and
   a clip located near each of said mating buckles configured to attach to child car seat anchor points to secure said delivery bag to a back seat of a vehicle.

15. The delivery bag according to claim 1 further comprising an inclined wedge configured to be removably attached to a bottom surface of said delivery bag wherein said inclined wedge is configured to hold said delivery bag in a horizontal position with respect to a vehicle by compensating for an inclined top surface of a seat within said vehicle.

16. The delivery bag according to claim 1 wherein said frame is configured to be placed in said delivery bag to face any desired position so that an orientation from which said tension bar is pulled can be chosen.

17. A method for restraining food and drink inside a delivery bag comprising:
   providing a food and drink delivery bag comprising:
      a frame;
      a tension bar attached to said frame configured to tensionably slide across a width of said frame and to provide constant horizontal tension against items placed in said delivery bag along said width of said frame; and
      an insulated bag covering said frame;
   inserting said frame into said insulated bag in a desired orientation;
   pulling said tension bar;

adding food or drink items into said insulated bag; and thereafter releasing said tension bar against said food or drink items.

18. The method according to claim 17 further comprising inserting drinks into a drink holder affixed to said frame.

19. The method according to claim 17 further comprising closing an oversized insulated cover configured to fit over items within said insulated bag and overlap top edges of said insulated bag.

20. The method according to claim 17 further comprising;
providing connection points on each of four corners of an outside surface of said delivery bag;
providing a pair of adjustable straps having mating buckles on one end of each strap and attachment points at an opposite end of each strap and a clip located near each of said mating buckles; and
performing one of the following:
  a) attaching said attachment points of said pair of adjustable straps to two adjacent of said connection points to secure said delivery bag by said adjustable straps and said buckles around a front seat of a vehicle; or
  b) attaching said attachment points of said pair of adjustable straps to two adjacent of said connection points and attaching each of said clips on said pair of adjustable straps to child car seat anchor points to secure said delivery bag to a back seat of a vehicle.

21. The method according to claim 20 wherein said two adjacent of said connection points are chosen so as to customize an opening direction of a cover attached to one side of said delivery bag.

22. The method according to claim 17 further comprising:
attaching an inclined wedge to a bottom surface of said delivery bag wherein said inclined wedge is configured to hold said delivery bag in a horizontal position with respect to a vehicle by compensating for an inclined top surface of a seat within said vehicle.

23. A food and drink delivery bag comprising:
a frame;
a tension bar attached to said frame configured to tensionably slide across a width of said frame and to provide constant tension against items placed in said delivery bag along said width of said frame;
a fixed panel affixed to said tension bar wherein said fixed panel divides an inside of said delivery bag into two compartments and wherein said fixed panel is configured to provide vertical stability to items within said delivery bag;
a cut out in said fixed panel configured to allow grasping of said tension bar to change a position of said tension bar along said width of said frame; and
an insulated bag covering said frame.

* * * * *